P. Ulmer,
Table Cutlery.

Nº 34,337. Patented Feb. 4, 1862.

Witnesses:
J. S. Brown
Jos. C. Ely

Inventor:
Philip Ulmer

UNITED STATES PATENT OFFICE.

PHILIP ULMER, OF PHILADELPHIA, PENNSYLVANIA, ASSIGNOR TO HIMSELF, L. H. WORMAN, AND JOS. O. ELY, OF SAME PLACE.

IMPROVED CONSTRUCTION OF KNIVES AND FORKS.

Specification forming part of Letters Patent No. 34,337, dated February 4, 1862.

*To all whom it may concern:*

Be it known that I, PHILIP ULMER, of Philadelphia, in the county of Philadelphia and State of Pennsylvania, have invented a new and Improved Mode of Constructing Table Knives and Forks; and I do hereby declare that the following is a full and exact description thereof, reference being had to the accompanying drawings, making part of this specification—

Figure 1:
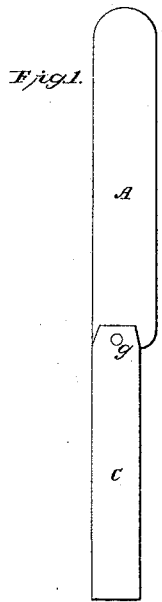
Figure 3:
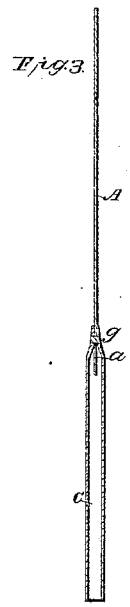
Figure 5:
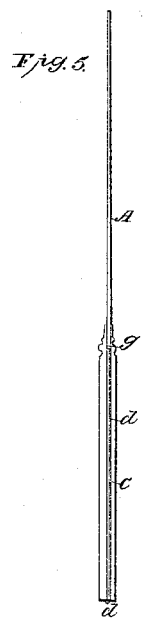
Figure 2:
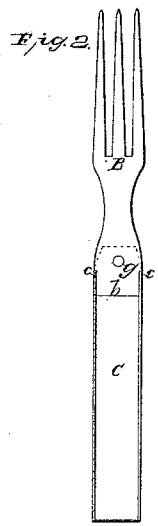
Figure 4:
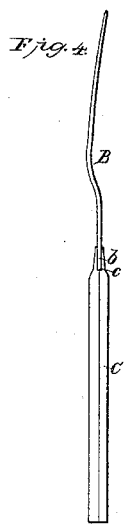
Figure 6:
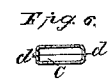
Figure 7:
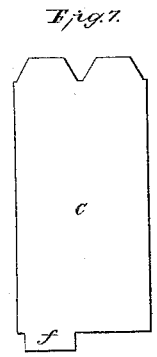

Figure 1 being a side view of a knife constructed in my improved manner; Fig. 2, a side view of a fork thus constructed, the handle being in section; Fig. 3, an edge view of the knife-blade and section of the handles; Fig. 4, an edge view of the fork; Fig. 5, an edge view of a knife, showing a slight modification in the mode of constructing the handle; Fig. 6, a transverse section of the handle in Fig. 5; Fig. 7, a view showing the shape of the piece of sheet metal of which the handle shown in Figs. 1, 2, 3, and 4, is formed.

Like letters designate corresponding parts in all the figures.

The object of my invention is to produce table knives and forks in the cheapest possible manner, both in labor and material, and at the same time to produce an article of excellent material, good form, and superior strength and durability.

To accomplish these results, I make the blade A of the knife and the tines B of the fork of sheet-steel of suitable thickness for the purpose, the forms being cut out with dies. A short shank $a$ is formed on the knife-blade, and a similar shank $b$ at the end of the fork-tines piece, substantially of the size and shape shown. Thus these portions of the knife and fork are made of the best material, but no more being used than necessary, and, being formed in the simplest manner, the objects intended are thus far accomplished.

The handle C of the knife or fork does not require to be of steel to be as good as desirable; but a much cheaper material—such as "sheet-tin" or common sheet-iron—is employed. Two pieces $c c$, Figs. 5 and 6, of similar form, are prepared of the proper shape, and then hollowed by dies, so that they will fit together at their edges and make a wholly-closed but hollow handle of usual or desirable form. These parts are soldered together at their edges and secured to the knife-blade or fork-tines, as hereinafter specified. In order to give greater strength and security to the soldered joints, the edges of the sheet metal may be turned out slightly, flange-like, as shown at $d$, thus giving more joining surface, and this may be the occasion of an ornamental bead on the handle.

If the handle is made of one piece of sheet metal, the form of the piece will be about as shown in Fig. 7, the main part C composing the four sides when suitably doubled together, and the projection $f$ inclosing the outer end.

The end of the handle which is joined to the blade or tines is flattened or compressed together, substantially as represented in the drawings, so as to closely pinch the shank of the knife or fork, and the said shank $a$ or $b$ is made just wide enough to fit tightly between the edges of the handle. The handle is then secured to the blade or tines shank by a single rivet $g$ or by solder, or both, and it will be found that the connection in either case is strong and firm. The whole knife or fork is then suitably finished in any desirable style.

The usual bolster at the end of the handle may be formed by a bead in the sheet metal, so as to make a "balance handle," and any ornamental form may in like manner be produced, if desired.

Knives and forks thus produced perfectly fulfill the objects above set forth.

What I claim as my invention, and desire to secure by Letters Patent, is—

Constructing the handles of table knives and forks of sheet metal shaped so as to be wholly closed and hollow, combined with the knife-blade or fork-tines formed of sheet-steel, substantially as and for the purpose herein specified.

PHILIP ULMER.

Witnesses:
J. S. BROWN,
JAS. O. ELY.